United States Patent
Furuyama

[19]
[11] Patent Number: 6,064,793
[45] Date of Patent: May 16, 2000

[54] REPRODUCING APPARATUS HAVING EDITING FUNCTION

[75] Inventor: Hiroaki Furuyama, Tachikawa, Japan

[73] Assignee: Canon Kabushiki Kaisha, Tokyo, Japan

[21] Appl. No.: 08/921,504

[22] Filed: Sep. 2, 1997

[30] Foreign Application Priority Data

Sep. 18, 1996 [JP] Japan .................................... 8-246156
Sep. 18, 1996 [JP] Japan .................................... 8-246161

[51] Int. Cl.⁷ .............................. H04N 5/93; G11B 27/00
[52] U.S. Cl. ................................. 386/52; 386/69; 358/906
[58] Field of Search ........................ 386/46, 52, 69–70; 358/906, 903.1; 348/211; H04N 5/93; G11B 27/00

[56] References Cited

U.S. PATENT DOCUMENTS

| | | |
|---|---|---|
| 4,668,999 | 5/1987 | De La Cierva, Sr. et al. ......... 358/906 |
| 5,043,828 | 8/1991 | Sasho ....................................... 386/52 |
| 5,526,125 | 6/1996 | Mori et al. .............................. 386/52 |
| 5,568,205 | 10/1996 | Hurwitz ................................. 348/723 |
| 5,897,216 | 4/1999 | Furuyama .............................. 386/52 |
| 5,899,576 | 5/1999 | Fukuzawa .............................. 386/52 |
| 5,956,458 | 9/1999 | Sezan et al. ............................ 386/95 |

*Primary Examiner*—Thai Tran
*Assistant Examiner*—Vincent F. Boccio
*Attorney, Agent, or Firm*—Robin, Blecker & Daley

[57] ABSTRACT

A reproducing apparatus having an editing function of performing editing by using another apparatus is arranged to, during the editing actions, output an information image signal indicating the status of progress of editing actions to the other apparatus during a period when the reproducing apparatus is searching for an information signal recorded on the recording medium, not to send the information image signal to the other apparatus during a period when the reproducing apparatus is reproducing the searched-for information signal, and to always display on a display of the reproducing apparatus an information image represented by the information image signal. Further, the reproducing apparatus is arranged to, if an editing end point on the recording medium is not set in setting an editing program, set the editing program to have the editing end point automatically set to the end of the recording medium, to search for and reproduce an information signal recorded on the recording medium according to the set editing program, and to cause the other apparatus to perform an editing recording action in accordance with the editing program. In the reproducing apparatus, an editing program can be easily set without any faulty operation, and when editing actions are to be carried out according to a plurality of editing programs, the operator is accurately informed of the status of progress of the editing actions.

16 Claims, 8 Drawing Sheets

REPRODUCING APPARATUS HAVING EDITING FUNCTION

BACKGROUND OF THE INVENTION

1. Field of the Invention

The present invention relates to a reproducing apparatus having an editing function of editing, by using another apparatus, an information signal recorded on a recording medium.

2. Description of Related Art

There are known a dubbing editing system for editing video signals recorded on a recording medium such as a video tape by reproducing them with a video tape recorder (hereinafter referred to as VTR) or the like and by dubbing them on another recording medium with another recording apparatus such as another VTR.

The dubbing editing system mentioned above has a so-called on-screen display function for displaying, on a monitor device connected to a VTR on the side of receiving the signals, information of various kinds showing the operating state of a VTR on the side of sending the video signals, such as a count value of a tape counter, an operation mode, a menu, etc., and also editing information of various kinds, such as details of an editing program. An information video signal indicative of the information of such kinds is sent from a video output terminal of the VTR on the sending side to a video input terminal of the VTR on the receiving side.

The above-stated conventional system in which the on-screen display function can be turned on and off as desired, however, has had the following shortcoming. In carrying out a dubbing editing operation, after the on-screen display is turned on for confirming, through the monitor device connected to the VTR on the receiving side, the operating state of the VTR on the sending side and details of an editing program, the operator of the system might proceed with the dubbing editing operation without turning off the on-screen display function by an oversight. In that event, video signals reproduced by the VTR on the sending side are sent to the VTR on the receiving side in a state of having the information video signal superimposed thereon while the on-screen display is left as it is. As a result, the VTR on the receiving side records video signals indicating video images on which unnecessary character images of various kinds showing the operating state of the VTR on the sending side, the details of an editing program, etc., are superimposed. In other words, video images would be recorded in a state of having unnecessary character images superimposed on the reproduced video images.

In order to avoid such a failure, the operator is required to manually turn off without fail the on-screen display function before execution of the dubbing editing operation. This requirement, therefore, causes the operation to be troublesome and degrades the operability of the dubbing editing system.

Further, the above-stated dubbing editing system has been arranged to perform a dubbing-recording editing operation in the following manner. In editing video signals which are recorded on a recording medium, one cut (amount) of video signals is set, for example, to be signals recorded from an arbitrarily set position to another arbitrarily set position on the recording medium, a plurality of cuts are set beforehand in an editing program, the plurality of cuts of the video signals recorded on the recording medium are serially looked up (searched) and reproduced by a reproducing VTR in accordance with the preset editing program, and the video signals thus reproduced are supplied to a recording VTR or the like for dubbing recording.

In a case where the editing program is to be set to have an arbitrary cut ending position set at the end of the recording medium, for example, the above-stated dubbing editing system necessitates a cut-out point to be set at the end of the recording medium as the cut ending position by actually shifting the position of a head to the end of the recording medium. This process causes the editing program setting operation to become troublesome.

Further, in a case where an editing program which has the above-stated cut-out point set at the end of the recording medium is included in a plurality of editing programs set with some other editing program arranged to be executed subsequent thereto among the plurality of the editing programs, the subsequent program is not carried out in actuality. Besides, in such a case, since the operator is not informed of the presence of the unexecuted subsequent editing program, the editing work tends to be performed differently from what has been intended by the operator.

BRIEF SUMMARY OF THE INVENTION

It is a general object of the invention to provide a reproducing apparatus having an editing function capable of solving the above-stated problems.

It is a more specific object of the invention to provide a reproducing apparatus of excellent operability having an editing function capable of preventing a faulty operation and allowing editing to be pleasantly carried out while confirming the status of progress of the editing work.

To attain the above objects, in accordance with an aspect of the invention, there is provided a reproducing apparatus having an editing function of editing, by using another apparatus, a video signal recorded on a recording medium, which comprises reproducing means for searching for a desired video signal recorded on the recording medium loaded on the reproducing apparatus, reproducing the searched-for video signal and outputting the reproduced video signal to the other apparatus, display means for displaying a video image represented by the video signal outputted from the reproducing means, control means for allowing at least one editing program to be set, storing beforehand the set editing program, controlling the reproducing means to search for and reproduce a video signal recorded on the recording medium in accordance with the stored editing program, and controlling the other apparatus to execute an editing recording action in accordance with the editing program, and information image output means having an information image output mode in which an information image signal indicating information of various kinds related to the editing program to be executed by the control means and information of various kinds related to an operating state of the reproducing means is outputted to the other apparatus and an information image non-output mode in which the information image signal is not outputted to the other apparatus, and arranged, while the control means is in process of executing an editing action according to the editing program, (i) to output the information image signal to the other apparatus in accordance with the information image output mode during a period when the reproducing means is searching for the video signal recorded on the recording medium, (ii) not to output the information image signal to the other apparatus in accordance with the information image non-output mode during a period when the reproducing means is reproducing the searched-for video signal from the recording medium, and (iii) to output the information image signal to the display means at all times.

It is another object of the invention to provide a reproducing apparatus having an editing function arranged to permit setting editing programs in a simple manner without necessitating to designate the end of a recording medium, in a case where any of editing programs is desired to include one cut set to cover from an arbitrary point to the end of a recording medium, and also to accurately inform the operator of the status of progress of editing work performed in accordance with a plurality of editing programs.

To attain the above object, in accordance with another aspect of the invention, there is provided a reproducing apparatus having an editing function of editing, by using another apparatus, an information signal recorded on a recording medium, which comprises reproducing means for searching for a desired information signal recorded on the recording medium loaded on the reproducing apparatus, reproducing the searched-for information signal and outputting the reproduced information signal to the other apparatus, and control means for (i) allowing at least one editing program to be set, each editing program being composed by designating an editing start point and an editing end point on the recording medium, (ii) if the editing end point has not been designated in setting the editing program, automatically setting the editing program in such a manner that the editing end point thereof is assumed to have been set to an end of the recording medium, (iii) storing beforehand the set editing program, (iv) controlling the reproducing means to search for and reproduce an information signal recorded on the recording medium in accordance with the stored editing program, and (v) controlling the other apparatus to execute an editing recording action in accordance with the editing program.

These and other objects and features of the invention will become apparent from the following detailed description of embodiments thereof taken in connection with the accompanying drawings.

BRIEF DESCRIPTION OF THE SEVERAL VIEWS OF THE DRAWING

FIGS. 3A-1, 3A-2, 3A-3, 3B-1, 3B-2 and 3B-3 show examples of display pictures obtained in the editing mode of the camera-integrated type VTR shown in FIG. 1.

DETAILED DESCRIPTION OF THE INVENTION

Preferred embodiments of the invention will be described in detail below with reference to the drawings.

Figure 1:
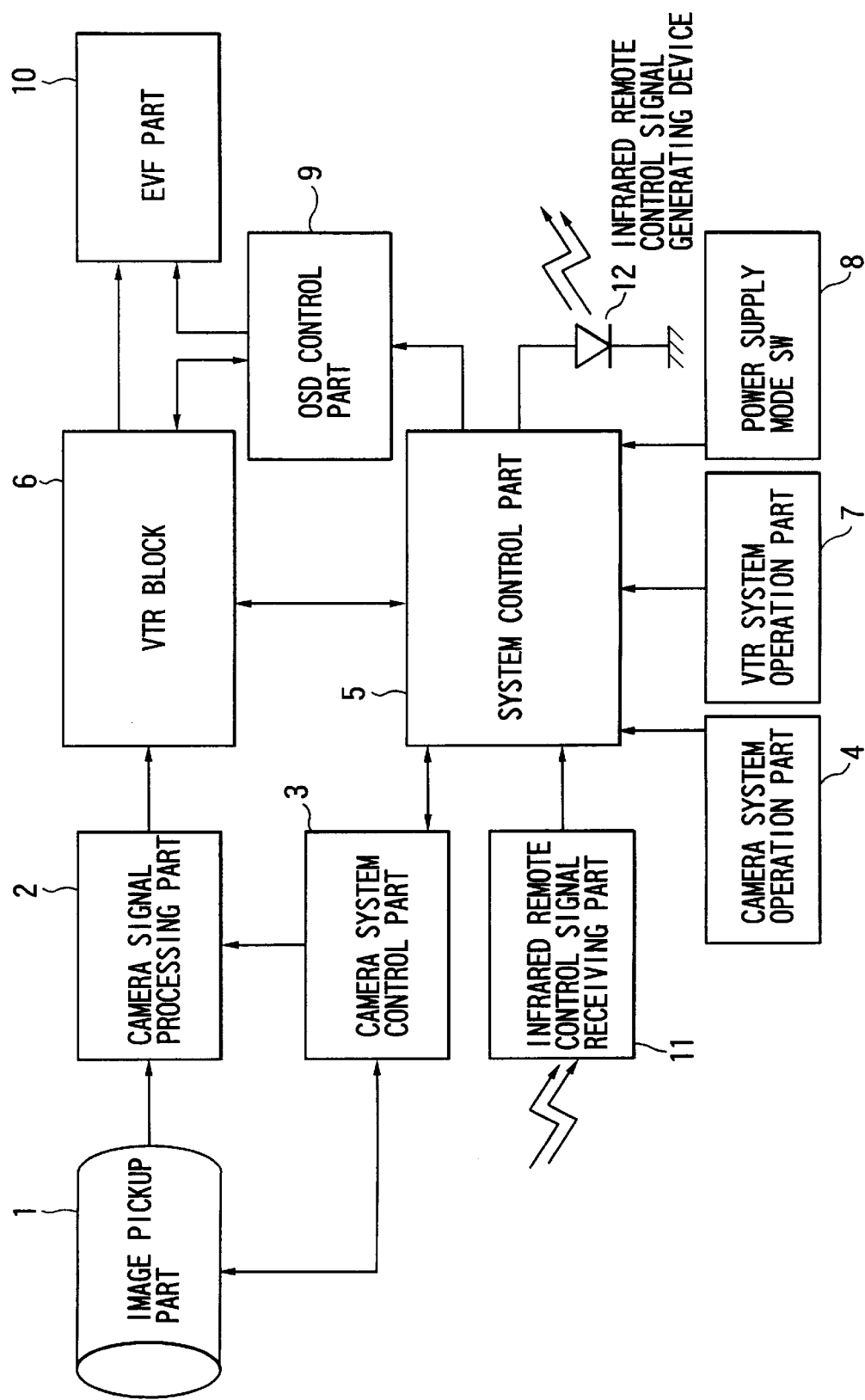
FIG. 1 is a block diagram showing in outline the arrangement of a camera-integrated type VTR arranged as a first embodiment of the invention.

FIG. 1 is a block diagram showing in outline the arrangement of a camera-integrated type VTR (video tape recorder) to which the invention is applied as a first embodiment thereof.

Referring to FIG. 1, an image pickup part 1 is composed of an image pickup optical system, an image sensor, an automatic focusing mechanism, a zoom mechanism, etc. The image pickup part 1 adjusts focus and the quantity of light, etc., according to control signals from a camera system control part 3, converts an optical image obtained by the image pickup optical system into a video signal and supplies the video signal to a camera signal processing part 2. The camera signal processing part 2 performs a predetermined signal processing action on the video signal from the image pickup part 1 according to a control signal from the camera system control part 3 and sends the processed video signal to a VTR block 6.

The VTR block 6 is composed of a video-and-audio signal processing part, a rotary head, a magnetic tape transport mechanism part for a magnetic tape employed as a recording medium, a driving part provided for driving the mechanism part, a servo control part for servo control over the driving part, etc. The VTR block 6 records and reproduces a video signal on and from the magnetic tape according to a control signal from a system control part 5. The video signal reproduced from the magnetic tape is supplied, for example, to another apparatus from an outside output terminal which is not shown as well as to an EVF (electronic viewfinder) part 10.

An OSD (on-screen display) control part 9 is arranged to generate a character image signal for on-screen display in accordance with a control signal and data from the system control part 5 and supplies the character image signal to the EVF part 10 so as to inform the operator of information of various kinds. The OSD control part 9 is also arranged to generate information signals for a title, a date, etc., to be superimposed on the video signal to be recorded or on the reproduced video signal and to supply the information signals to the VTR block 6. The OSD control part 9 is further arranged to output, through the VTR block 6 and the outside output terminal (not shown), and supply to the other apparatus the information of various kinds about the body of the VTR, such as the characters and symbols to be displayed at the EVF part 10 and also a character image signal for on-screen display indicating a guide indication to be used in setting a menu, as will be described later. The EVF (electronic viewfinder) part 10 is provided with a CRT or a liquid crystal display panel for displaying video images. The EVF part 10 is thus arranged not only to show video images represented by picked-up or reproduced video signals but also the images of the character image signals for an on-screen display supplied from the OSD control part 9 and indicating information of various kinds about the body of the VTR in characters and symbols and also a guide indication to be made in setting a menu.

The system control part 5 includes among others a microcomputer which controls in an overall manner various functions of the camera-integrated type VTR in the first embodiment of the invention. The system control part 5 has various functions including a timer function. In the case of the first embodiment, these functions include power supply mode control, control over the transition of operating modes of the VTR block 6 from one mode over to another, control over the display of information of various kinds, control of an editing mode and storing and holding of shooting modes and editing programs. Further, the system control part 5 is provided with a nonvolatile memory element such as an EEPROM or the like or a nonvolatile memory element such as an SRAM or the like which is backed up by a battery, so that data of various kinds can be retained even in the event of cutoff of power supply.

An infrared remote control signal generating device 12 is arranged to output a control signal from the system control part 5 as an infrared remote control signal for a remote operation on another apparatus employed as a recording apparatus. An infrared remote control signal receiving part 11 is arranged to receive an infrared remote control signal transmitted from a remote control device which is not shown and to supply the system control part 5 with control data codes indicated by the infrared remote control signal received.

A camera system operation part 4 is composed of switches and dials of various kinds related to the camera system and provided for turning on/off of an automatic focusing (AF) function, automatic/lock switching of automatic exposure control (AE), selection of a programmed AE, etc. When the camera system operation part 4 is operated by the operator, information on the operated state of the operation part 4 is transferred from the system control part 5 to the camera system control part 3. The camera system control part 3 is composed of a microcomputer, etc., and is arranged to control the whole camera system in accordance with instructions received from the system control part 5 and the camera system operation part 4.

A VTR system operation part 7 is composed of switches of various kinds related to the VTR system and the whole apparatus, including, for example, "ON SCREEN", "UP", "DOWN", "RIGHT", "LEFT", "EXECUTE", "MENU", "PLAY", "FF/REW", "STOP" and "START/STOP" switches. The VTR system operation part 7 is arranged to supply the system control part 5 with information on the instructions given by the operator.

A power supply mode switch 8 is provided for selection of one of the power supply modes of the VTR body including "camera", "VTR", "editing" and "off" modes. The system control part 5 reads the state of the power supply mode switch 8 and sets the power supply mode and the operation mode of the camera part and the VTR part to predetermined modes accordingly.

Figure 2:
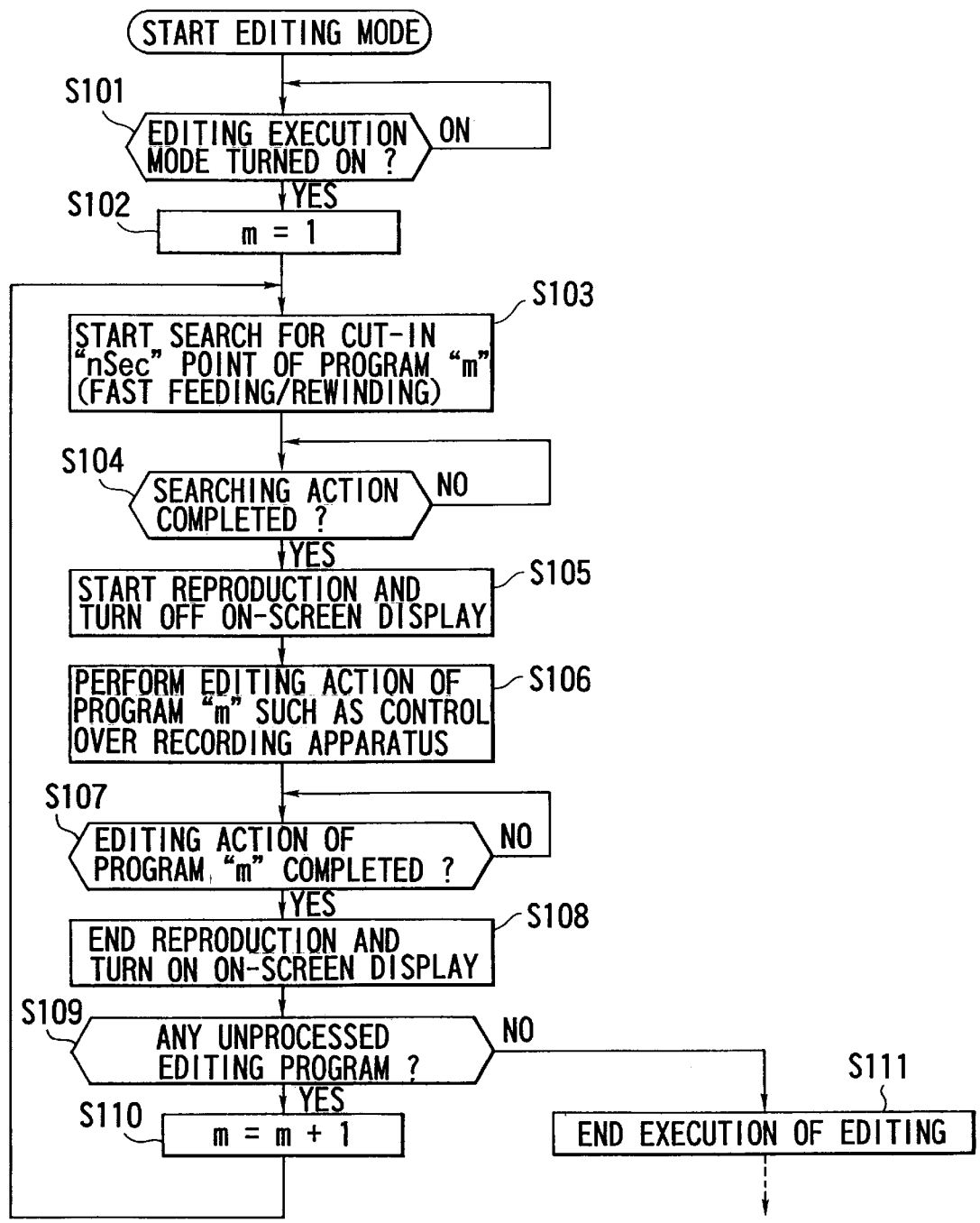
FIG. 2 is a flow chart showing an operation in an editing mode of the camera-integrated type VTR shown in FIG. 1.

FIG. 2 is a flow chart showing an operation in the editing mode of the camera-integrated type VTR in the first embodiment of the invention. In the case of the first embodiment, the operating mode of the VTR is arranged to be set to the editing mode by operating the above-stated power supply mode switch 8.

Figures 1, 2, 3, 3A, 3B:
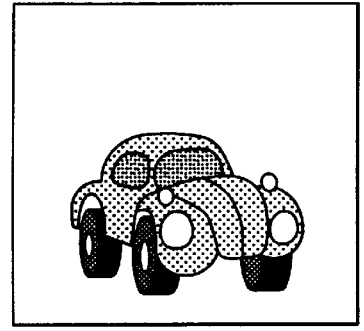

FIGS. 3A-1, 3A-2, 3A-3, 3B-1, 3B-2 and 3B-3 show examples of display pictures obtained in the editing mode. FIG. 3A-1 shows by way of example a display picture obtained at the electronic viewfinder of the EVF part 10 of the camera-integrated type VTR. FIG. 3B-1 shows by way of example an on-screen display picture represented by a character image signal supplied to the other apparatus through an outside output terminal which is not shown.

Referring to FIG. 3A-1, there are displayed an indication 3a1 indicative of a total period of time of all cuts of an editing program, an indication 3a2 indicative of a current count value of a tape counter of the camera-integrated type VTR, a guide indication 3a3 indicative of a cut-in for the editing program, a guide indication 3a4 indicative of a cut-out for the editing program, an operation mode indication 3a5 indicative of an operating state of the camera-integrated type VTR, indications 3a6, 3a7 and 3a8 indicative of the contents of the first, second and third editing programs, respectively, i.e., the tape count value of the cut-in timing and that of the cut-out timing of each of the editing programs, and a pointer 3a9 indicative of an editing program currently in process of being executed. As shown, the editing program currently in process of execution of an editing action is indicated in an inverted state. Further, in FIG. 3A-1, there are displayed a guide indication 3a10 indicative of an editing setting mode, a guide indication 3a11 indicative of an editing erasure mode, a guide indication 3a12 indicative of an editing rehearsal mode, a guide indication 3a13 indicative of an editing execution mode, a guide indication 3a14 indicative of an editing total erasure mode. Each of the guide indications 3a11 to 3a14 is arranged to be displayed in an inverted state, as shown, when the associated mode is selected.

Referring to the flow chart of FIG. 2, in the editing mode, first, at a step S101, a check is made to find if the editing execution mode is selected to be turned on. If so, the flow of operation proceeds to a step S102 to initialize an editing program No. "m" to "1" before proceeding to the next step S103. If not, the same check is repeated until the editing execution mode is found to be turned on.

At the step S103, in order to search for a point on the magnetic tape (recording medium) which is indicated by a count value "nSec" of cut-in timing of the editing program No. "m" and is, in the case of the first embodiment, a point preceding the cut-in timing by a length of time necessary before the travel of the tape is stabilized to give an adequate state of reproduction, the VTR block 6 begins to rewind or fast feed the magnetic tape. FIGS. 3A-1 and 3B-1 show by way of example an image displayed at the electronic viewfinder of the camera-integrated type VTR and an on-screen display image, respectively, obtained during the search of the cut-in timing point for the second editing program. The display image at the electronic viewfinder (EVF) and the on-screen display image are provided with character images as shown in FIGS. 3A-1 and 3B-1.

At a step S104 of FIG. 2, a check is made to find if the above-stated search has been completed. If so, the flow of operation proceeds to a step S105. At the step S105, a reproducing action is caused to begin at the VTR block 6, and, at the same time, the on-screen display is automatically turned off to avoid showing the on-screen display image on the screen. FIG. 3A-2 shows a display image on the electronic viewfinder when the camera-integrated type VTR is performing the reproducing action. As shown, in this display image, character images are superimposed on a reproduced video image (i.e., a video image of an automobile). FIG. 3B-2 shows a display image represented by the video signal sent from the camera-integrated type VTR to the other apparatus when the camera-integrated type VTR is performing the reproducing action. As shown, in this display image, the display of the character images is turned off. In other words, the on-screen display of the character images is in an off-state, because the other apparatus is supplied with only the video signal representing the reproduced video image.

At a step S106 of FIG. 2, editing process actions are performed according to the editing program No. "m", which include control over the other apparatus connected to the camera-integrated type VTR. In other words, if the other apparatus is a recording apparatus, the control is performed, for example, to cause the recording apparatus to start a recording action. At a step S107, a check is made for completion of the editing process actions of the editing program No. "m" by finding if the tape position has arrived at a cut-out timing point set in the editing program. If so, the flow proceeds to a step S108. At the step S108, the reproducing action of the VTR block 6 of the camera-integrated type VTR is ended (i.e., brought into a paused state), and, at the same, the on-screen display is automatically turned on. Then, the flow proceeds to a step S109.

At the step S109, a check is made to find if any editing program remains unexecuted. If so, the flow proceeds to a step S110 to increment the editing program No. "m" by one. The flow then returns to the step S103 to repeat the above-described steps S103 to S109. If not, the flow proceeds from the step S109 to a step S111 to terminate the execution of editing. FIGS. 3A-3 and 3B-3 show by way of example a display image of the electronic viewfinder of the camera-integrated type VTR and an on-screen image, respectively, obtained during the search of the cut-in timing point of the third editing program which is subsequent to the second editing program mentioned above. As shown, the display image of the electronic viewfinder and the on-screen display image are displayed in the form of character images.

The camera-integrated type VTR according to the first embodiment of the invention is arranged, as described above, to automatically turn off the on-screen display function when the camera-integrated type VTR on the side of the signal sending side is in process of reproduction in the editing execution mode, even if the on-screen display function happens to be not turned off by an oversight. Meanwhile, the character images which are displayed by the on-screen display function are arranged to be displayed always at the electronic viewfinder of the camera-integrated type VTR on the signal sending side irrespective as to whether the on-screen display function is turned on or turned off. This arrangement enables the operator to perform editing work while confirming the status of progress of the editing work without inadvertently causing the unnecessary character images which indicate the state of operation of the camera-integrated type VTR and the details of the editing program to be recorded in a state of being superimposed on the video signal by the other apparatus such as a VTR which is disposed on the signal receiving side and connected to the camera-integrated type VTR.

The arrangement described above enables the first embodiment to effectively prevent a faulty operation and to permit editing work to be pleasantly carried out while confirming the status of progress of the editing work. The arrangement thus provides a reproducing apparatus having an editing function of excellent operability.

Figure 4:
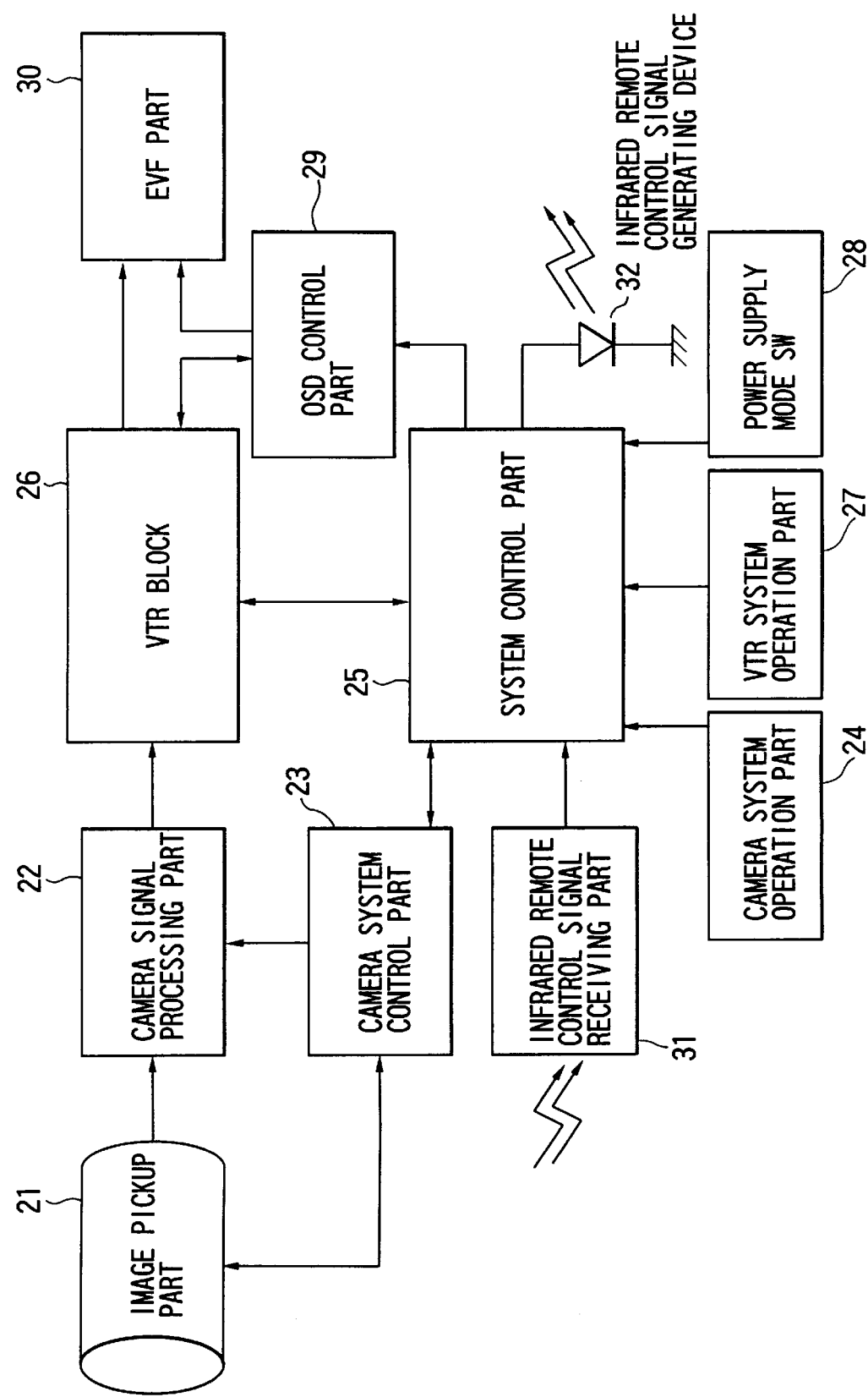
FIG. 4 is a block diagram showing in outline the arrangement of a camera-integrated type VTR arranged as a second embodiment of the invention.

FIG. 4 is a block diagram showing in outline the arrangement of a camera-integrated type VTR according to a second embodiment of the invention.

Referring to FIG. 4, an image pickup part 21 is composed of an image pickup optical system, an image sensor, an automatic focusing mechanism, a zoom mechanism, etc. The image pickup part 21 adjusts focus and the quantity of light, etc., according to control signals from a camera system control part 23, converts an optical image obtained by the image pickup optical system into a video signal and supplies the video signal to a camera signal processing part 22. The camera signal processing part 22 performs a predetermined signal processing action on the video signal from the image pickup part 21 according to a control signal from the camera system control part 23 and sends the processed video signal to a VTR block 26.

The VTR block 26 is composed of a video-and-audio signal processing part, a rotary head, a magnetic tape transport mechanism part for a magnetic tape employed as a recording medium, a driving part provided for driving the mechanism part, a servo control part for servo control over the driving part, etc. The VTR block 26 records and reproduces a video signal on and from the magnetic tape according to a control signal from a system control part 25. The video signal reproduced from the magnetic tape is supplied, for example, to another apparatus from an outside output terminal which is not shown as well as to an EVF (electronic viewfinder) part 30.

An OSD (on-screen display) control part 29 is arranged to generate a character image signal for on-screen display in accordance with a control signal and data from the system control part 25 and supplies the character image signal to the EVF part 30 so as to inform the operator of information of various kinds. The OSD control part 29 is also arranged to generate information signals for a title, a date, etc., to be superimposed on the video signal to be recorded or on the reproduced video signal and to supply the information signals to the VTR block 26. The OSD control part 29 is further arranged to output, through the VTR block 26 and the outside output terminal (not shown), and supply to the other apparatus the information of various kinds about the body of the VTR, such as the characters and symbols to be displayed at the EVF part 30 and also a character image signal for on-screen display indicating a guide indication to be used in setting a menu, as will be described later. The EVF (electronic viewfinder) part 30 is provided with a CRT or a liquid crystal display panel for displaying video images. The EVF part 30 is thus arranged not only to show video images represented by picked-up or reproduced video signals but also the images of the character image signals for an on-screen display supplied from the OSD control part 29 and indicating information of various kinds about the body of the VTR in characters and symbols and also a guide indication to be made in setting a menu.

The system control part 25 includes among others a microcomputer which controls in an overall manner various functions of the camera-integrated type VTR in the first embodiment of the invention. The system control part 25 has various functions including a timer function. In the case of the first embodiment, these functions include power supply mode control, control over the transition of operating modes of the VTR block 26 from one mode over to another, control over the display of information of various kinds, control of an editing mode and storing and holding of shooting modes and editing programs. Further, the system control part 25 is provided with a nonvolatile memory element such as an EEPROM or the like or a nonvolatile memory element such as an SRAM or the like which is backed up by a battery, so that data of various kinds can be retained even in the event of cutoff of power supply.

An infrared remote control signal generating device 32 is arranged to output a control signal from the system control part 25 as an infrared remote control signal for a remote operation on another apparatus employed as a recording apparatus. An infrared remote control signal receiving part 31 is arranged to receive an infrared remote control signal transmitted from a remote control device which is not shown and to supply the system control part 25 with control data codes indicated by the infrared remote control signal received.

A camera system operation part 24 is composed of switches and dials of various kinds related to the camera system and provided for turning on/off of an automatic focusing (AF) function, automatic/lock switching of automatic exposure control (AE), selection of a programmed AE, etc. When the camera system operation part 24 is operated by the operator, information on the operated state of the operation part 24 is transferred from the system control part 25 to the camera system control part 23. The camera system control part 23 is composed of a microcomputer, etc., and is arranged to control the whole camera system in accordance with instructions received from the system control part 25 and the camera system operation part 24.

A VTR system operation part 27 is composed of switches of various kinds related to the VTR system and the whole apparatus, including, for example, "ON SCREEN", "UP", "DOWN", "RIGHT", "LEFT", "EXECUTE/REGISTER", "MENU", "PLAY", "FF/REW", "STOP" and "START/STOP" switches. The VTR system operation part 27 is arranged to supply the system control part 25 with information on the instructions given by the operator.

A power supply mode switch 28 is provided for selection of one of the power supply modes of the VTR body including "camera", "VTR", "editing" and "off" modes. The system control part 25 reads the state of the power supply mode switch 28 and sets the power supply mode and the operation mode of the camera part and the VTR part to predetermined modes accordingly.

Figure 5:
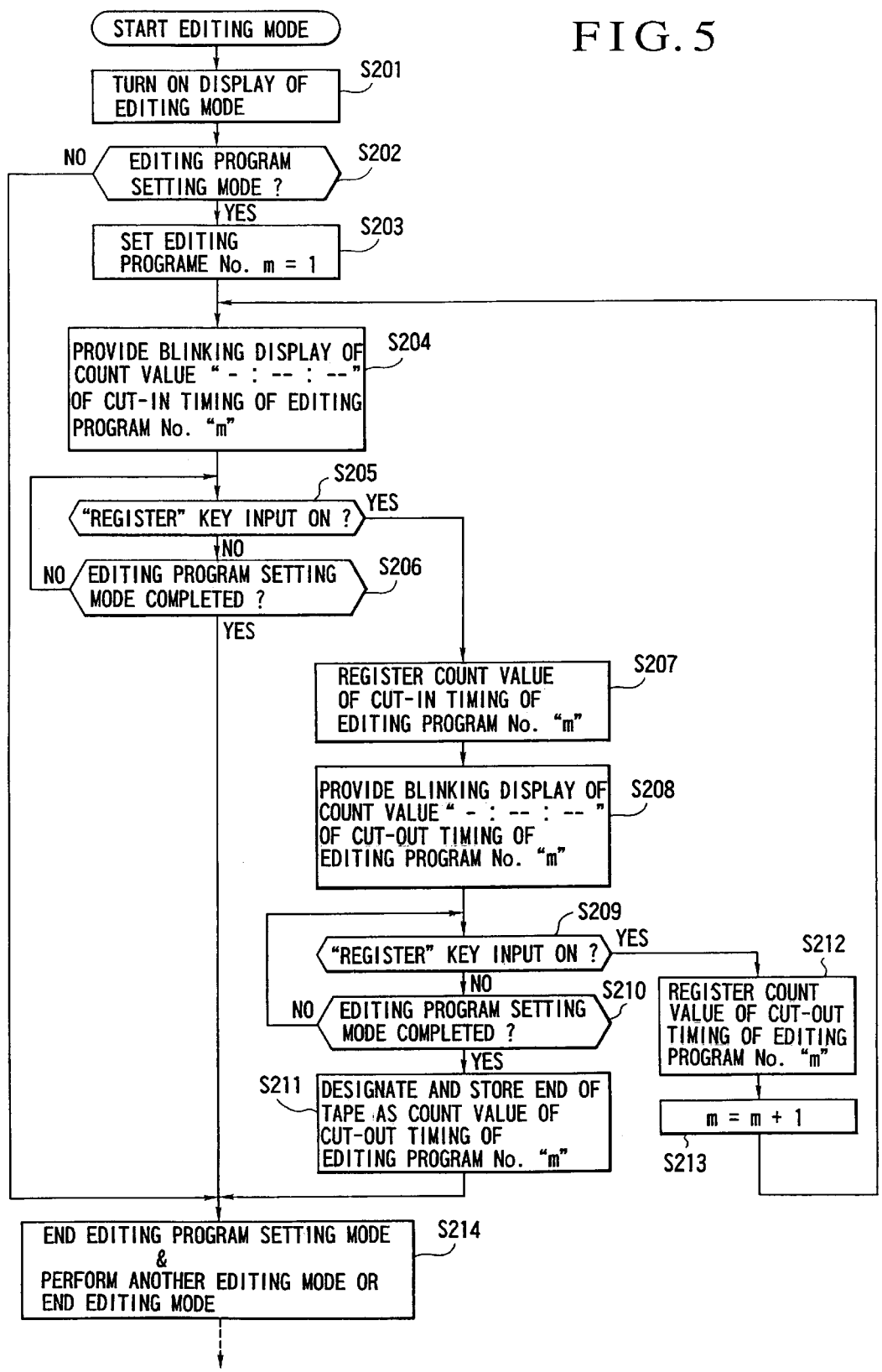
FIG. 5 is a flow chart showing an operation in an editing mode of the camera-integrated type VTR shown in FIG. 4.

FIG. 5 is a flow chart showing an operation in the editing mode of the camera-integrated type VTR which is shown in FIG. 4 as the second embodiment of the invention. In the case of the second embodiment, the operating mode of the VTR is arranged to be set in the editing mode by operating the above-stated power supply mode switch 28.

FIGS. 6A to 6E show examples of display pictures obtained in the editing mode at the EVF part 30 of the camera-integrated type VTR.

Figure 6A:
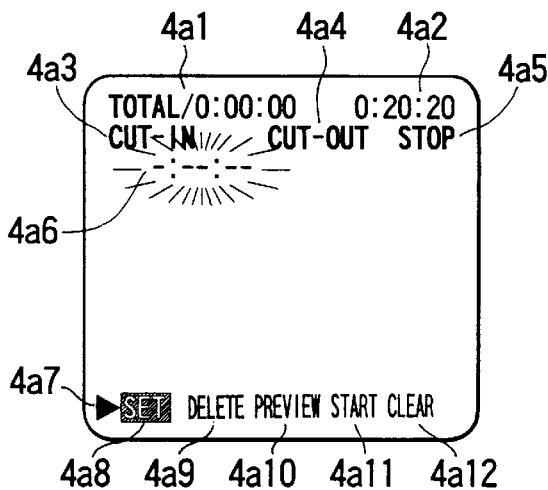
FIGS. 6A, 6B, 6C, 6D and 6E show examples of display pictures obtained in the editing mode of the camera-integrated type VTR shown in FIG. 4.

In FIG. 6A, there are displayed an indication 4a1 indicative of a total period of time of all cuts of an editing program, an indication 4a2 indicative of a current count value of a tape counter of the camera-integrated type VTR, a guide indication 4a3 indicative of a cut-in for the editing program, a guide indication 4a4 indicative of a cut-out for the editing program, an operation mode indication 4a5 indicative of an operating state of the camera-integrated type VTR, an indication 4a6 indicative of the cut-in or cut-out point of an editing program which can be set at present (more specifically, the tape count value of the cut-in timing or that of the cutout timing for an editing program on which setting work is currently in process is displayed in a blinking manner), and a pointer 4a7 indicative of the content of work currently in process. When the editing work is in process, the pointer 4a7 is located in front of the indication of the editing program being currently executed and the indication of that editing program having the pointer 4a7 is shown in an inverted state. Further, in FIG. 6A, there are displayed a guide indication 4a8 indicative of an editing setting mode, a guide indication 4a9 indicative of an editing erasure mode, a guide indication 4a10 indicative of an editing rehearsal mode, a guide indication 4a11 indicative of an editing execution mode, and a guide indication 4a12 indicative of an editing total erasure mode. As shown in FIGS. 6A to 6E, each of the guide indications 4a8 to 4a12 is displayed in an inverted state when the associated mode is selected.

Referring to FIG. 5, with the editing mode selected, the start of the editing mode is displayed at a step S201. At the next step S202, a check is made to find if an editing program setting mode is selected to be turned on. If so, the flow of operation proceeds to a step S203 to initialize an editing program No. "m" to "1". If not, the flow proceeds to a step S214 to terminate the editing program setting mode or to proceed with some other processes in the editing mode, or to terminate the editing mode. Description of the other processes is omitted here.

At the step S204, a point on the magnetic tape which is indicated by a count value of the cut-in timing of the editing program No. "m" and is, in the case of the second embodiment, a point preceding the cut-in timing by a length of time necessary before the travel of the tape is stabilized to give an adequate state of reproduction is displayed in a blinking manner in such a manner as "- : -- : --", as shown in FIG. 6A, to indicate that the cut-in timing point of the editing program is currently in a state of waiting for a setting action thereon.

At a step S205, a check is made to find if an inputting operation is performed through the "register" key by the operator with the cut-in point on the magnetic tape searched out and the setting action on the cut-in timing point for the searched-out cut-in point completed. If not, the flow proceeds to a step S206. At the step S206, a check is made to find if the editing program setting mode has been terminated with the mode switched over to some other mode. If not, the flow returns to the step S205 to repeat the above-stated check until the "register" key is operated. In the event of switch-over to some other mode, the flow proceeds to the step S214. When the "register" key input operation is found at the step S205 to be performed, the flow proceeds from the step S205 to a step S207.

Figure 6D:
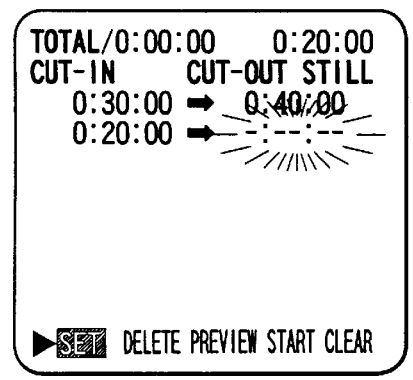
Figure 6B:
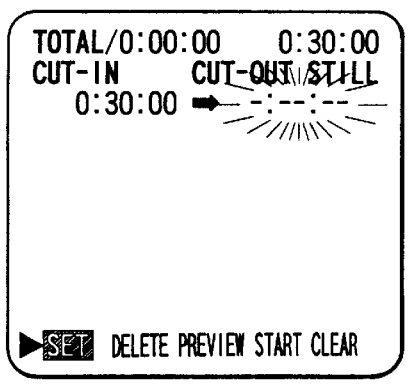

At the step S207, a count value "nSec" which indicates the cut-in timing point on the tape of the editing program No. "m" is registered. At a step S208, to show that the flow of operation is in a state of waiting for a setting action on the count value of a cut-out point indicating a cut-out timing point on the tape of the editing program No. "m", a blinking display of "- : -- : --" is provided as shown in FIG. 6B.

At a step S209, a check is made to find if the input operation on the "register" key is performed by the operator with a cut-out point on the tape searched out and the setting action on the cut-out timing point for the searched-out cut-out point completed. If not, the flow proceeds to a step S210. At the step 210, a check is made to find if the editing program setting mode has been terminated, for example, with the mode switched over to some other mode. If not, the flow returns to the step S209 to repeat the above-stated check until the "register" key is operated. In the event of termination of the mode, the flow proceeds to a step S211. At the step S211, the end of the tape is considered to be designated as the count value of the cut-out timing indicating the cut-out timing point on the tape of the editing program No. "m". Then, the editing program is stored in a memory disposed within the system control part 25 for storing editing programs, and the flow proceeds to the step S214. If the "register" key input operation is found to be performed at the step S209, the flow proceeds from the step S209 to a step S212.

Figure 6E:
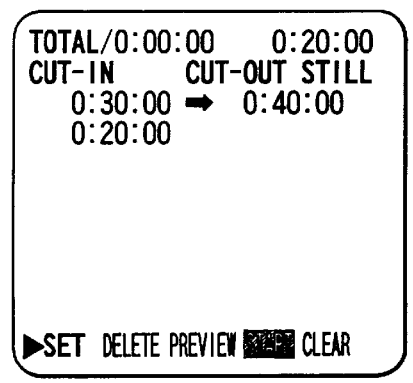
Figure 6C:
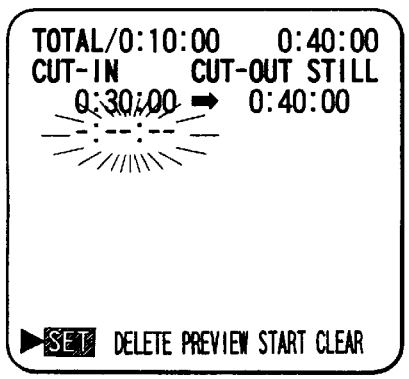

At the step S212, a count value "nSec" of the cut-out timing indicating the cut-out timing point on the tape of the editing program No. "m" is considered to be designated, as shown in FIG. 6C. Then, the cut-out timing point is registered by storing the editing program in the editing program storing memory disposed within the system control part 25. At a step S213, the editing program No. "m" is incremented by one. The flow then returns to the step S204 to execute a setting action on the next editing program by repeating the editing program setting steps S204 through S214 described above. FIGS. 6D and 6E show examples of display pictures of the electronic viewfinder obtained at this time. Referring to FIG. 6E, since no count value of the cut-out timing point on the tape is indicated for the second editing program in this case, the operator can recognize that the end of the tape is designated as the count value of the cut-out timing of that editing program.

The camera-integrated type VTR according to the second embodiment of the invention as described above operates as shown in FIG. 5 to set the end of the tape as a cut-out point of the editing program in setting an editing program. In a case where editing work by dubbing recording is desired to be performed with a part of the tape from an arbitrary point to the end of the tape as one cut in setting an editing program, therefore, the tape end can be set as the count value of the cut-out timing of the editing program without designating the end of the tape by actually moving the head to the end of the tape, so that the editing program setting work can be much simplified.

Figure 7:
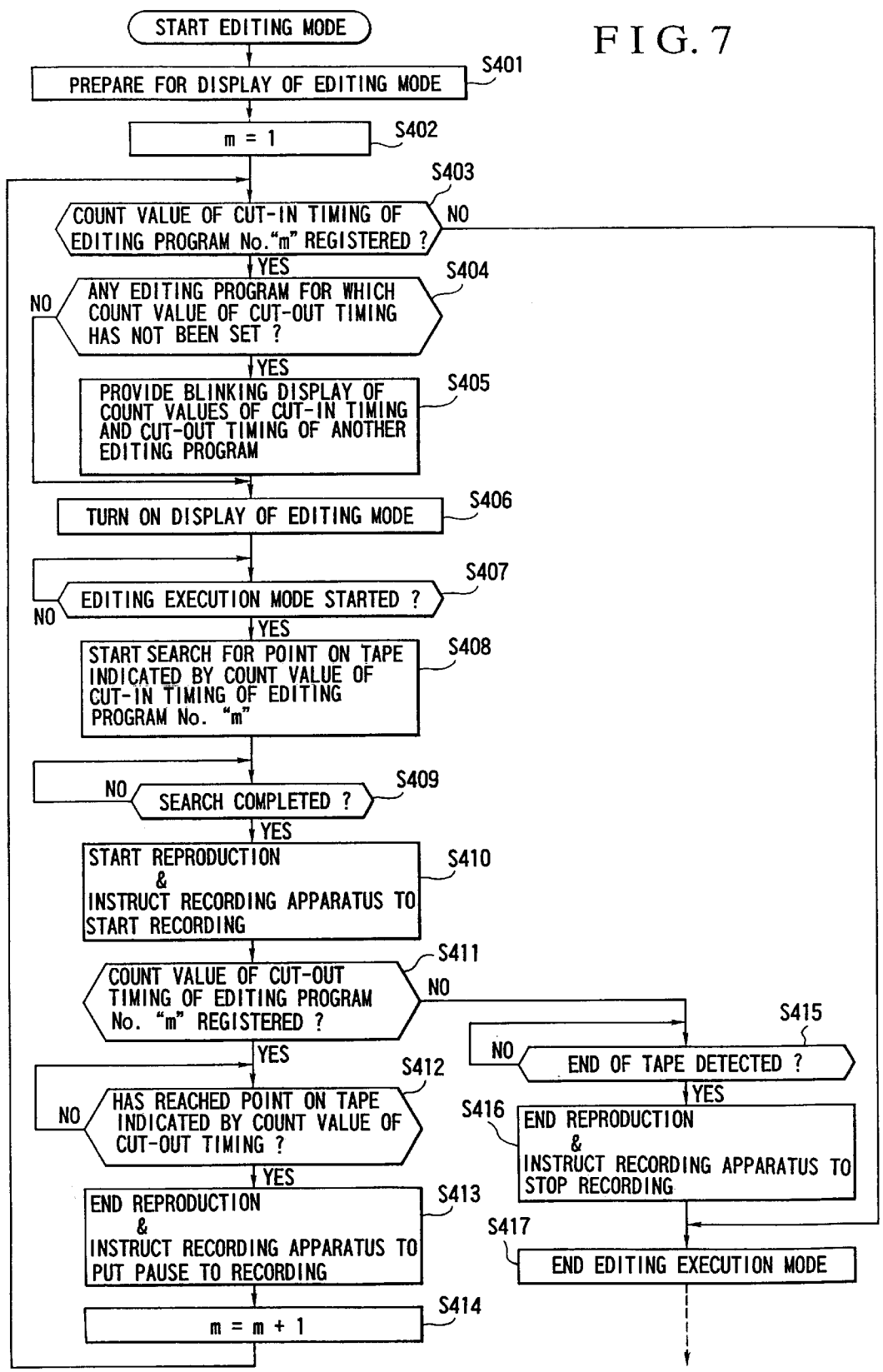
FIG. 7 is a flow chart showing another operation procedure to be taken in the editing mode of the camera-integrated type VTR shown in FIG. 4.

FIG. 7 is a flow chart showing another operation procedure to be executed when the camera-integrated type VTR according to the second embodiment of the invention is in the editing mode. The operation mode of the camera-integrated type VTR can be set by operating the above-stated power supply mode switch 28, in the same way as in the operation shown in FIG. 5.

Figure 8A:
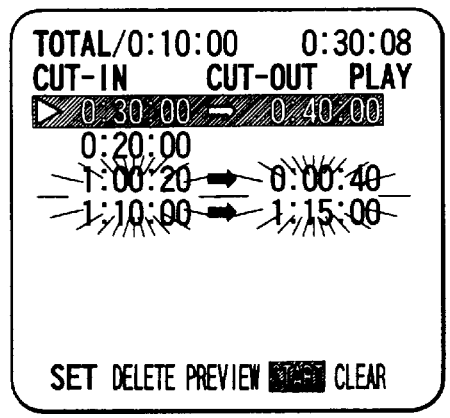
FIGS. 8A, 8B and 8C show other examples of display pictures obtained in the editing mode of the camera-integrated type VTR shown in FIG. 4.
Figure 8B:
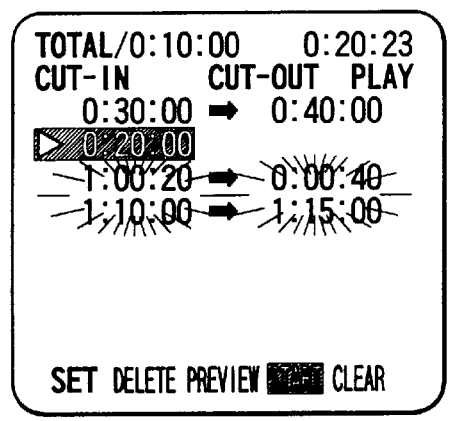
Figure 8C:
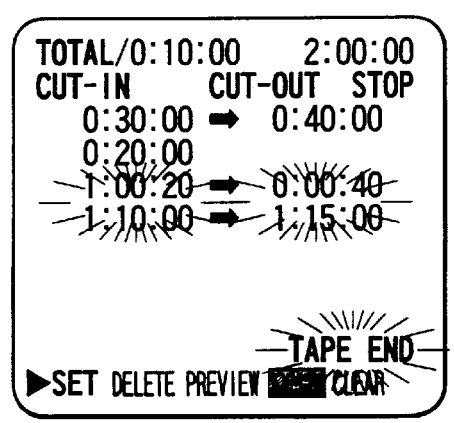

FIGS. 8A, 8B and 8C show other examples of display pictures obtained at the electronic viewfinder of the EVF part 30 of the camera-integrated type VTR in the editing mode.

Referring to FIG. 7, in the editing mode, an editing execution mode is first considered to be selected and turned on, and preparation is made for a display of the editing mode at a step S401. At a step S402, an editing program No. "m" is initialized to "1". Then, the flow of operation proceeds to a step S403.

At the step S403, a check is made to find if the count value of a cut-in timing point of the editing program No. "1" has been set. If so, the flow of operation proceeds to a step S404. If not, no editing process can be executed, and the flow thus proceeds to a step S417 on the assumption that there is no unprocessed editing program. The step S417 will be described later herein.

At the step S404, a check is made for any editing program for which no count value of a cut-out timing point has been set, thus tacitly designating the end of the tape as the cut-out timing count value of a cut-out timing point on the tape of the editing program. For this purpose, editing programs are serially checked beginning with the editing program No. "1". If any editing program is found in such a state and that program is found to be followed by some other editing program, the flow proceeds to a step S405. At the step S405, indications of count values indicative of cut-in and cut-out timing points of the above-stated other program are caused to blink to give a warning to the operator that no editing action will be performed for the editing program indicated by such a blinking display of the count values of cut-in and cut-out timing points.

After execution of these processes, the flow proceeds to a step S406 to shift the editing mode display from the preparation state to an on-state. At the next step S407, the flow remains in a standby state until the start of the editing execution mode is detected.

Upon detection of the start of the editing execution mode at the step S407, the flow proceeds to a step S408. At the step S408, to search for a point on the tape which is indicated by a count value "nSec" of cut-in timing of the editing program No. "m" and is, in the case of this embodiment, a point preceding the cut-in timing by a length of time necessary before the travel of the tape is stabilized to give an adequate state of reproduction, the VTR block 26 begins to rewind or fast feed the tape. At this time, in the display picture on the electronic viewfinder of the EVF part 30 of the camera-integrated type VTR, the count values of the cut-in and cut-out timing points of the first editing program are displayed in an inverted state, as shown in FIG. 8A, to inform the operator that the editing work is in process of execution according to the editing program. Meanwhile, since no count value of the cut-out timing point is displayed for the second editing program in this case, the operator is enabled to assume that the end of the tape is designated as the cut-out timing point of the second editing program. Further, the count values indicative of the cut-in and cut-out timing points of other editing programs set subsequent to the second editing program are displayed in a blinking state to warn the operator that no editing action will be performed for these editing programs.

At a step S409 in FIG. 7, the flow remains in a standby state until the above-stated search is determined to have been completed. When the search is determined to be completed, the flow proceeds to a step S410. At the step S410, a reproducing action begins at the VTR block 26. At the same time, another apparatus which is connected to the camera-integrated type VTR and used as a recording apparatus is instructed to start recording. At a step S411, a check is made to find if the count value of the cut-out timing point for the editing program No. "m" is set. If so, the flow proceeds to a step S412. If not, the flow proceeds to a step S415.

At the step S412, a traveling state of the tape under the reproducing action of the VTR block 26 is monitored until the head arrives at a point on the tape indicated by the count value "nSec" of the cut-out timing point of the editing program No. "m". Upon detection of arrival of the head at this point, the flow proceeds to a step S413. At the step S413, the other recording apparatus connected to the camera-integrated type VTR is instructed to put pause to its recording action. At the same time, the reproducing action of the VTR block 26 is brought to a stop. At a step S414, the editing program No. "m" is incremented by one, and the flow returns to the step S403 to execute again the editing actions of the steps S403 to S414 for the next editing program.

At the step S415, on the other hand, since the count value of the cut-out timing point of the editing program No. "m" is determined not to be set at the step S411, the end of the tape is assumed to be designated at the cut-out timing point on the tape for the editing program, and the traveling state of the tape under the reproducing action of the VTR block 26 is monitored until the head arrives at the end of the tape. When the head is found to have reached the end of the tape, the flow proceeds to a step S416. At the step S416, the recording apparatus connected to the camera-integrated type VTR is instructed to bring its recording action to an end. At the same time, the reproducing action of the VTR block 26 is brought to an end to terminate the execution of the editing action according to the editing program. At the step S417, the editing execution mode is terminated. At this time, as shown in FIG. 8B, the display picture on the electronic viewfinder of the EVF part 30 of the camera-integrated type VTR shows the count values of the cut-in and cut-out timing points of the editing program in an inverted state for the purpose of informing the operator that the editing action is in process of execution in accordance with the second editing program, in this case.

Then, even if some other editing program is set subsequently to the second editing program, no editing action is executed for the subsequent editing program, as mentioned in the foregoing. At the step S417, the inverted display on the electronic viewfinder display picture of the EVF part 30 of the camera-integrated type VTR which indicates the count values of the cut-in and cut-out timing points of the editing program currently being executed is canceled, and an indication reading "TAPE END" is provided in a blinking state, as shown in FIG. 8C. This blinking display informs the operator that the head has reached the end of the tape and the entirety of the editing executing action has been completed, that is, informs the operator of the end of the editing executing action. The editing execution mode thus comes to an end.

As described above, according to the operation shown in FIG. 7 of the camera-integrated type VTR in the second embodiment of the invention, in a case where the end of the tape is set as a cut-out point of the editing program in setting an editing program and a plurality of editing programs are to be set including an editing program requiring editing work by dubbing recording to be carried out with a part of the tape from an arbitrary point to the end of the tape used for one cut, the operator can be accurately informed of the status of progress of the editing work being executed according to the plurality of editing programs.

The second embodiment described above gives a reproducing apparatus having an editing function arranged to solve the problems of the prior art described in the foregoing. The editing function is arranged to allow an editing program to be set in a simple manner without actually designating the end of the recording medium in a case where editing work is desired to be carried out with a recording medium part from an arbitrary point to the end of the recording medium used as one cut of editing work. Further, in a case where the editing work is to be carried out according to a plurality of editing programs, the second embodiment is capable of accurately informing the operator of the status of progress of editing processes according to the plurality of editing programs.

I claim:

1. A reproducing apparatus having an editing function of editing, by using another apparatus, a video signal recorded on a recording medium, comprising:

(A) reproducing means for searching for a desired video signal recorded on the recording medium loaded on said reproducing apparatus, reproducing the searched-for video signal and outputting the reproduced video signal to the other apparatus;

(B) display means for displaying a video image represented by the video signal outputted from said reproducing means;

(C) control means for allowing at least one editing program to be set, storing beforehand the set editing program, controlling said reproducing means to search for and reproduce a video signal recorded on the recording medium in accordance with the stored editing program, and controlling the other apparatus to execute an editing recording action in accordance with the editing program; and (D) information image output means having an information image output mode in which an information image signal indicating information of various kinds related to the editing program to be executed by said control means and information of various kinds related to an operating state of said reproducing means is outputted to the other apparatus and an information image non-output mode in which the information image signal is not outputted to the other apparatus, and arranged, while said control means is in process of executing an editing action according to the editing program, (i) to output the information image signal to the other apparatus in accordance with the information image output mode during a period when said reproducing means is searching for the video signal recorded on the recording medium, (ii) not to output the information image signal to the other apparatus in accordance with the information image non-output mode during a period when said reproducing means is reproducing the searched-for video signal from the recording medium, and (iii) to output the information image signal to said display means at all times.

2. A reproducing apparatus according to claim 1, wherein said display means is arranged to cause an information image represented by the information image signal supplied from said information image output means to be displayed in a state of being superimposed on the video image represented by the video signal outputted from said reproducing means.

3. A reproducing apparatus according to claim 1, wherein said editing program is a program for designating an editing start point and an editing end point of the recording medium on which the video signal to be edited is recorded.

4. A reproducing apparatus according to claim 3, wherein said reproducing means is arranged to perform such an editing action as to search for the editing start point of the recording medium and start and stop a reproducing action in accordance with a program concerning the editing start point and the editing end point of the recording medium designated by the editing program.

5. A recording and reproducing apparatus arranged to pick up an image of an object and to record a video signal corresponding to the picked-up object image on a recording medium, and having an editing function of editing, by using another apparatus, a video signal recorded on the recording medium, comprising:

(A) image pickup means for picking up the object image and outputting the video signal corresponding to the picked-up object image;

(B) recording and reproducing means for recording the video signal outputted from said image pickup means on the recording medium loaded on said recording and reproducing apparatus, and for searching for a desired video signal recorded on the recording medium, reproducing the searched-for video signal and outputting the reproduced video signal to the other apparatus;

(C) display means for displaying a video image represented by the video signal outputted from said image pickup means or a reproduced video image represented by the video signal outputted from said recording and reproducing means;

(D) control means having a normal operation control mode of controlling said image pickup means and said recording and reproducing means to cause said recording and reproducing means to record the video signal outputted from said image pickup means on the recording medium and reproduce the video signal recorded on the recording medium, and an automatic editing action control mode of allowing at least one editing program to be set, storing beforehand the set editing program, controlling said recording and reproducing means to search for and reproduce a video signal recorded on the recording medium in accordance with the stored editing program, and controlling the other apparatus to execute an editing recording action in accordance with the editing program, and arranged to control an operation of said recording and reproducing apparatus in accordance with one of the normal operation control mode and the automatic editing action control mode; and (E) information image output means having an information image output mode in which an information image signal indicating information of various kinds related to the editing program to be executed by said control means and information of various kinds related to an operating state of said recording and reproducing means is outputted to the other apparatus and an information image non-output mode in which the information image signal is not outputted to the other apparatus, and arranged, while said control means is in process of executing an editing action according to the editing program based on the automatic editing action control mode, (i) to output the information image signal to the other apparatus in accordance with the information image output mode during a period when said recording and reproducing means is searching for the video signal recorded on the recording medium, (ii) not to output the information image signal to the other apparatus in accordance with the information image non-output mode during a period when said recording and reproducing means is reproducing the searched-for video signal from the recording medium, and (iii) to output the information image signal to said display means at all times.

6. A recording and reproducing apparatus according to claim 5, wherein said display means is arranged to cause an information image represented by the information image signal supplied from said information image output means to be displayed in a state of being superimposed on the video image represented by the video signal outputted from said recording and reproducing means.

7. A recording and reproducing apparatus according to claim 5, wherein said editing program is a program for designating an editing start point and an editing end point of the recording medium on which the video signal to be edited is recorded.

8. A recording and reproducing apparatus according to claim 7, wherein said recording and reproducing means is arranged to perform such an editing action as to search for the editing start point of the recording medium and start and stop a reproducing action in accordance with a program concerning the editing start point and the editing end point of the recording medium designated by the editing program.

9. A reproducing apparatus having an editing function of editing, by using another apparatus, an information signal recorded on a recording medium, comprising:

(A) reproducing means for searching for a desired information signal recorded on the recording medium loaded on said reproducing apparatus, reproducing the searched-for information signal and outputting the reproduced information signal to the other apparatus; and (B) control means for (i) allowing at least one editing program to be set, each editing program being composed by designating an editing start point and an editing end point on the recording medium, (ii) if the editing end point has not been designated in setting the editing program, automatically setting the editing program in such a manner that the editing end point thereof is assumed to have been set to an end of the recording medium, (iii) storing beforehand the set editing program, (iv) controlling said reproducing means to search for and reproduce an information signal recorded on the recording medium in accordance with the stored editing program, and (v) controlling the other apparatus to execute an editing recording action in accordance with the editing program.

10. A reproducing apparatus according to claim 9, wherein, if a plurality of set editing programs include at least one editing program which designates the end of the recording medium as the editing end point thereof, said control means is arranged to cause, in executing editing processing actions according to the plurality of editing programs, after completion of the editing processing action for the editing program which designates the end of the recording medium as the editing end point thereof, all the editing processing actions according to remaining editing programs to be terminated without being executed, and, in that event, cause a warning to be given to an operator of said reproducing apparatus with respect to the remaining editing programs left unexecuted.

11. A reproducing apparatus having an editing function of editing, by using another apparatus, a video signal recorded on a recording medium, comprising:

(A) reproducing means for searching for a desired video signal recorded on the recording medium loaded on said reproducing apparatus, reproducing the searched-for video signal and outputting the reproduced video signal to the other apparatus;

(B) display means for displaying a video image represented by the video signal outputted from said reproducing means;

(C) control means for (i) allowing at least one editing program to be set, each editing program being composed by designating an editing start point and an editing end point on the recording medium, (ii) if the editing end point has not been designated in setting the editing program, automatically setting the editing program in such a manner that the editing end point thereof is assumed to have been set to an end of the recording medium, (iii) storing beforehand the set editing program, (iv) controlling said reproducing means to search for and reproduce an information signal recorded on the recording medium in accordance with the stored editing program, and (v) controlling the other apparatus to execute an editing recording action in accordance with the editing program; and (D) information image output means having an information image output mode in which an information image signal indicating information of various kinds related to the editing program to be executed by said control means and information of various kinds related to an operating state of said reproducing means is outputted to the other apparatus and an information image non-output mode in which the information image signal is not outputted to the other apparatus, and arranged, while said control means is in process of executing an editing action according to the editing program, (i) to output the information image signal to the other apparatus in accordance with the information image output mode during a period when said reproducing means is searching for the video signal recorded on the recording medium, (ii) not to output the information image signal to the other apparatus in accordance with the information image non-output mode during a period when said reproducing means is reproducing the searched-for video signal from the recording medium, and (iii) to output the information image signal to said display means at all times.

12. A reproducing apparatus according to claim 11, wherein, if a plurality of set editing programs include at least one editing program which designates the end of the recording medium as the editing end point thereof, said control means is arranged to cause, in executing editing processing actions according to the plurality of editing programs, after completion of the editing processing action for the editing program which designates the end of the recording medium as the editing end point thereof, all the editing processing actions according to remaining editing programs to be terminated without being executed, and, in that event, cause a warning to be given to an operator of said reproducing apparatus with respect to the remaining editing programs left unexecuted.

13. A reproducing apparatus according to claim 11, wherein said display means is arranged to cause an information image represented by the information image signal supplied from said information image output means to be displayed in a state of being superimposed on the video image represented by the video signal outputted from said reproducing means.

14. A recording and reproducing apparatus arranged to pick up an image of an object and to record a video signal corresponding to the picked-up object image on a recording medium, and having an editing function of editing, by using another apparatus, a video signal recorded on the recording medium, comprising:

(A) image pickup means for picking up the object image and outputting the video signal corresponding to the picked-up object image;

(B) recording and reproducing means for recording the video signal outputted from said image pickup means on the recording medium loaded on said recording and reproducing apparatus, and for searching for a desired video signal recorded on the recording medium, reproducing the searched-for video signal and outputting the reproduced video signal to the other apparatus;

(C) display means for displaying a video image represented by the video signal outputted from said image pickup means or a reproduced video image represented by the video signal outputted from said recording and reproducing means;

(D) control means having a normal operation control mode of controlling said image pickup means and said recording and reproducing means to cause said recording and reproducing means to record the video signal outputted from said image pickup means on the recording medium and reproduce the video signal recorded on the recording medium, and an automatic editing action control mode of allowing at least one editing program to be set, each editing program being composed by designating an editing start point and an editing end point on the recording medium, (ii) if the editing end point has not been designated in setting the editing program, automatically setting the editing program in such a manner that the editing end point thereof is assumed to have been set to an end of the recording medium, (iii) storing beforehand the set editing program, (iv) controlling said recording and reproducing means to search for and reproduce an information signal recorded on the recording medium in accordance with the stored editing program, and (v) controlling the other apparatus to execute an editing recording action in accordance with the editing program, and arranged to control an operation of said recording and reproducing apparatus in accordance with one of the normal operation control mode and the automatic editing action control mode; and (E) information image output means having an information image output mode in which an information image signal indicating information of various kinds related to the editing program to be executed by said control means and information of various kinds related to an operating state of said recording and reproducing means is outputted to the other apparatus and an information image non-output mode in which the information image signal is not outputted to the other apparatus, and arranged, while said control means is in process of executing an editing action according to the editing program based on the automatic editing action control mode, (i) to output the information image signal to the other apparatus in accordance with the information image output mode during a period when said recording and reproducing means is searching for the video signal recorded on the recording medium, (ii) not to output the information image signal to the other apparatus in accordance with the information image non-output mode during a period when said recording and reproducing means is reproducing the searched-for video signal from the recording medium, and (iii) to output the information image signal to said display means at all times.

15. A recording and reproducing apparatus according to claim 14, wherein, if a plurality of set editing programs include at least one editing program which designates the end of the recording medium as the editing end point thereof, said control means is arranged to cause, in executing editing processing actions according to the plurality of editing programs, after completion of the editing processing action for the editing program which designates the end of the recording medium as the editing end point thereof, all the editing processing actions according to remaining editing programs to be terminated without being executed, and, in that event, cause a warning to be given to an operator of said reproducing apparatus with respect to the remaining editing programs left unexecuted.

16. A recording and reproducing apparatus according to claim 14, wherein said display means is arranged to cause an information image represented by the information image signal supplied from said information image output means to be displayed in a state of being superimposed on the video image represented by the video signal outputted from said recording and reproducing means.

* * * * *

UNITED STATES PATENT AND TRADEMARK OFFICE
CERTIFICATE OF CORRECTION

PATENT NO.   : 6,064,793
DATED        : May 16, 2000
INVENTOR(S)  : Hiroaki Furuyama It is certified that error appears in the above-identified patent and that said Letters Patent is hereby corrected as shown below:

Title page,
[57], last line delete "status of progress of the editing actions." and insert -- status of progress of the editing actions, so that editing work can be smoothly carried out while confirming the status of progress of the editing work. --.

Column 9,
Line 42, delete "cut out timing" and insert -- cut out timing --.

Signed and Sealed this

Twenty-eighth Day of August, 2001

*Attest:*

*Nicholas P. Godici*

*Attesting Officer*

NICHOLAS P. GODICI
*Acting Director of the United States Patent and Trademark Office*